United States Patent [19]

Aldissi

[11] Patent Number: 4,929,389
[45] Date of Patent: May 29, 1990

[54] WATER-SOLUBLE CONDUCTIVE POLYMERS

[75] Inventor: Mahmoud Aldissi, Sante Fe, N. Mex.

[73] Assignee: The United States of America as represented by the Department of Energy, Washington, D.C.

[21] Appl. No.: 155,450

[22] Filed: Feb. 12, 1988

[51] Int. Cl.$^5$ .............................. H01B 1/00
[52] U.S. Cl. .................... 252/500; 252/518; 526/256; 526/258; 524/408; 524/422; 524/404; 524/167; 524/401; 524/415; 528/490; 528/38
[58] Field of Search ............ 252/500, 512, 518; 526/258, 256; 204/59 R; 528/380, 490, 491, 492; 524/423, 422, 408, 415, 404, 405, 156, 165, 166, 167, 401

[56] References Cited

U.S. PATENT DOCUMENTS 4,691,005 9/1987 Sato et al. .............................. 252/500
4,711,742 1/1987 Oen et al. .............................. 252/512

OTHER PUBLICATIONS

A. O. Patil et al., "Water-Soluble Conducting Polymers," J. Am. Chem. Soc. 109, 1858 (Mar. / 18, 1987).
K. Tamao et al., "Nickel-Phosphonine Complex-Catalyzed Grignard Coupling-II: Grignard Coupling of Heterocyclic Compounds," Tetrahedron 38 (22), 3347–3354 (1982).
A. F. Diaz et al., "Electrochemical Polymerization of Pyrrole," J.C.S. Chem. Comm. 635≧636 (1979).
K. Keiji Kanzawa et al., "'Organic Metals': Polypyrrole, A Stable Synthetic 'Metallic' Polymer." J.C. S. Chem. Comm., 854–855 (1979).
Kwan-Yue et al., "Highly Conducting, Soluble, Environmetnally-Stable Poly(3-alkyl-thiophenes), " J. Chem. Soc., Chem. Commun., 1346 (1986).

Primary Examiner—Josephine Barr
Attorney, Agent, or Firm—Richard J. Cordovano; Paul D. Gaetjens; Judson R. Hightower

[57] ABSTRACT

Polymers which are soluble in water and are electrically conductive. The monomer repeat unit is a thiophene or pyrrole molecule having an alkyl group substituted for the hydrogen atom located in the beta position of the thiophene or pyrrole ring and having a surfactant molecule at the end of the alkyl chain. Polymers of this class having 8 or more carbon atoms in the alkyl chain exhibit liquid crystalline behavior, resulting in high electrical anisotropy. The monomer-to-monomer bonds are located between the carbon atoms which are adjacent to the sulfur or nitrogen atoms. The number of carbon atoms in the alkyl group may vary from 1 to 20 carbon atoms. The surfactant molecule consists of a sulfonate group, or a sulfate group, or a carboxylate group, and hydrogen or an alkali metal. Negative ions from a supporting electrolyte which may be used in the electrochemical synthesis of a polymer may be incorporated into the polymer during the synthesis and serve as a dopant to increase the conductivity.

9 Claims, No Drawings

WATER-SOLUBLE CONDUCTIVE POLYMERS

BACKGROUND OF THE INVENTION

The present invention relates to the field of polymer chemistry. This invention is the result of a contract with the Department of Energy (Contract No. W-7405-ENG-36).

There are numerous uses for organic polymers which are conductors of electricity at normal ambient temperatures. Potential application areas include organic conductors and semiconductors, elements in integrated electronic circuits, information storage systems, temperature sensors, gas and irradiation detectors, pressure indicators, rectifiers, and electrochromic display devices. Also, electrochemistry and photoelectrochemistry are potential areas of interest, particularly for battery and fuel cell applications. In addition, conducting polymers may be of use for static charge dissipation and electromagnetic interference shielding.

In many applications, it is desirable that an electrically conductive polymer be capable of dissolution in common solvents. Conductive polymers which are soluble in organic solvents such as acetone, methylene chloride, and benzene are known. However, prior to the present invention, there was no known electrically conductive organic polymer which is capable of dissolution in water. It is often preferable, where the application permits, to use water in connection with the manufacturing and processing of a conductive polymer, in order to avoid disadvantages involved in the use or organic solvents. These disadvantages include toxicity, cost of the solvent, and requirements of safe disposal of used solvent.

Liquid crystals are fluids that typically contain elongated organic molecules that spontaneously acquire long-range orientational order at characteristic temperatures or concentrations. Lyotropic liquid crystalline polymers are a type of liquid crystal polymers that form ordered fluid phases in solution. Liquid crystalline polymers have technological potential in areas ranging from microelectronics to biotechnology. Polymers having liquid crystal properties are unusually strong and tough; for example, a liquid crystalline polymer is the principal material used in "bullet-proof" vests.

The starting point for synthesis of polymers of the present invention is a five-member ring consisting of four carbon atoms and a sulfur atom (thiophene) or a nitrogen atom (pyrrole). Polythiophene and polypyrrole, the polymers derived from these monomers, are not soluble in any common solvent and are not electrically conductive unless a dopant is added. However, poly(3-alkylthiophene), which requires a dopant for electrical conductivity, is soluble in common organic solvents if the alkyl group is comprised of four or more carbons, as discussed in a brief article by Jen et al. entitled "Highly Conducting, Soluble, and Environmentally stable Poly(3-alkyl-thiophene)," J. Chem. Soc. Comm., 1346 (1986).

A. O. Patil et al., "Water-Soluble Conducting Polymers," J. Am. Chem. Soc. 109, 1858 (Mar. 18, 1987) reports on two water-soluble conducting polymers: sodium poly(3-thiophene-β-ethylsulfonate) and sodium poly(3-thiophene-δ-butanesulfonate).

SUMMARY OF THE INVENTION

This invention is a class of polymers which are soluble in water and are electrically conductive. The monomer repeat unit is a thiophene or pyrrole molecule having an alkyl group substituted for the hydrogen atom located in the beta position of the thiophene or pyrrole ring and having a surfactant molecule at the end of the alkyl chain. Polymers of this class having 8 or more carbon atoms in the alkyl chain exhibit liquid crystalline behavior, resulting in high electrical anisotropy.

The monomer-to-monomer bonds are located between the carbon atoms which are adjacent to the sulfur or nitrogen atoms. The number of carbon atoms in the alkyl group may vary from 1 to 20 carbon atoms. The surfactant molecule consists of a sulfonate group, or a sulfate group, or a carboxylate group, and hydrogen or an alkali metal. Negative ions from a supporting electrolyte which may be used in the electrochemical synthesis of a polymer may be incorporated into the polymer during the synthesis and serve as a dopant to increase the conductivity. Also, conventional dopants may be used.

It is an object of the present invention to provide polymers which will conduct electricity.

It is also an object of the present invention to provide electrically conductive polymers which are soluble in water and do not require the use of organic solvents in connection with their manufacture.

It is a further object of the present invention to provide water-soluble, self-doping polymers, that is, polymers which will conduct electricity without the addition of a dopant.

Another object is to provide electrically conductive polymers having liquid crystalline properties.

In a broad embodiment, the present invention is a polymeric composition of matter having a monomer repeat unit comprising:

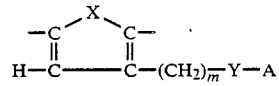

where the monomer-to-monomer bonds of said polymer are located between the carbon atoms adjacent to X; where X is chosen from a group consisting of NH and S; where m is a whole number having a value of from 1 to 20, inclusive; where Y is chosen from a class consisting of a sulfonate group ($SO_3$), a sulfate group ($SO_4$), and a carboxylate group ($CO_2$); and where A is chosen from a class consisting of hydrogen, lithium, sodium, potassium, rubidium, and cesium.

In one embodiment having liquid crystalline properties, X is sulfur, m has a value of 10, Y is an $SO_3$ group, and A is sodium.

DETAILED DESCRIPTION OF THE INVENTION

A dopant is a substance which is added to a polymer in small quantities in order to cause the mixture of polymer and dopant to be electrically conductive. The polymers of the present invention may be termed self-doped, that is, what may be viewed as a dopant is an integral part of the polymer rather than a separate substance added to the polymer to form a mixture of polymer and dopant. However, though these polymers are electrically conductive without a dopant, the magnitude of the conductivity can be increased by adding a dopant material.

Also, an effect equivalent to doping is inherent in the method of synthesis of the polymers of the present invention when a supporting electrolyte is used; that is, negative ions from the supporting electrolyte used in the synthesis are present in the polymer and serve as a dopant. Of course, this effect is not present when a supporting electrolyte is not used as a part of the synthesis bath. If it is desired to synthesize a composition of this invention, using a supporting electrolyte such that the composition exhibits electrical conductivity due only to the self-doping effect, the polarity of the electrochemical cell used for synthesis is reversed after formation of the polymer is complete. Reversing the polarity, that is, using the anode of the polymerization reaction as the cathode and, similarly, changing the cathode to the anode and applying a voltage drives the negative ions out of the polymer.

Synthesis of polymers of the present invention may be accomplished using the halogenated heterocyclic ring compounds 3-halothiophene or 3-halopyrrole as starting points; these are available from chemical supply houses or may be prepared by methods known to those skilled in the art. Then, 3-alkylthiophenes and 3-alkylpyrroles may be prepared from the halogenated heterocycles by the procedures outlined in an article by K. Tamao et al., "Nickel-Phosphine Complex-Catalyzed Grignard Coupling-II: Grignard Coupling of Heterocyclic Compounds," Tetrahedron 38 (22), 3347–3354 (1982). Other methods of synthesis of these alkyl heterocycles are known to those skilled in the art. For example, see the above-cited article by Jen et al.

In order to prepare a monomer repeat unit of the present invention from 3-alkylthiophene or 3-alkylpyrrole, a starting point is to add an OH group to the end of the alkyl chain. This may be accomplished by treating 3-alkylthiophene or 3-alkylpyrrole with a dilute solution of hydrogen chloride or by means of a Friedel-Crafts reaction using a catalyst comprised of iron chloride and copper chloride.

The OH group on the end of the alkyl chain is then replaced with a surfactant molecule, which may also be termed a soap molecule. The surfactant molecule includes hydrogen or an alkali metal. In one method of accomplishing this, the ring compound with an alkyl group at the number three position is reacted with mesylate chloride, whereupon the hydrogen atom of the OH group is replaced with a mesylate molecule and by-product hydrogen chloride is formed. A reaction with sodium iodide is then used to replace the mesylate molecule with a sodium atom, the reaction by-product being mesylate iodide. A dilute solution of sulfurous acid is utilized to complete the synthesis of a monomer of the present invention having $SO_3Na$ as the soap molecule.

When the alkyl contains two carbons, the group attached to the thiophene or pyrrole ring is $CH_2-CH_2-SO_3Na$. An $SO_4$ or $CO_2$ group may replace the sulfonate group and the sodium atom may be replaced with a hydrogen, lithium, potassium, rubidium, or cesium atom. Those skilled in the art are familiar with the substances which may be used in synthesizing other monomers of the present invention by means of the above-described procedures. For example, if potassium iodide is substituted for sodium iodide, the alkali metal of the soap molecule will be potassium. Further, if it is desired to substitute a hydrogen atom for the alkali metal, it is only necessary to dissolve the polymer in water, add an acid, and evaporate to form the solid polymer. Also, those skilled in the art are familiar with alternate methods of preparing the monomers of the present invention from 3-alkylthiophene or 3-alkylpyrrole.

A monomer repeat unit is polymerized to form a polymer of the present invention by electrochemical means which are generally familiar to those skilled in the art. For example, 3-ethylsulfonate sodium thiophene was polymerized onto a platinum foil working electrode from a plating bath consisting of the monomer, a supporting electrolyte ($LiBF_4$), and a solvent (acetonitrile), using an applied potential of about 0.5 V vs. an $Ag/AgNO_3$ electrode.

The following articles may be consulted for information on electrochemical polymerization: A. F. Diaz et al., "Electrochemical Polymerization of Pyrrole," J.C.S. Chem. Comm. 635–636 (1979); K. Keiji Kanazawa et al., "'Organic Metals': Polypyrrole, A Stable Synthetic 'Metallic' Polymer," J.C.S. Chem. Comm., 854–855 (1979); Keiichi Kaneto et al., "Electrical Properties Of Conducting Polymer, Poly-Thiophene, Prepared By Electrochemical Polymerization," Jpn. J. Appl. Phys. 21 (9), L567–L568 (September 1982).

Polymers were synthesized in a three-compartment electrochemical cell using an indium-tin oxide conducting glass working electrode or a platinum foil working electrode. The counter-electrode was of platinum foil, wire, or mesh. A saturated calomel or $Ag/AgNO_3$ reference electrode was used. The electrodes were immersed in solutions consisting of the monomer in a solvent in a concentration of about 0.1 mole of monomer per liter of solution or both the monomer and a supporting electrolyte substance in a solvent, where the concentration of the supporting electrolyte was also 0.1 mol/L of solution.

The solvents used in the polymerizations were water and acetonitrile. It is expected that benzonitrile, propylene carbonate, and tetrahydrofuran may also be used as solvents. The supporting electrolyte substances used were tetraethylammonium para-toluenesulfonate, and lithium tetrafluoborate ($LiBF_4$). Lithium hexafluophosphate ($LiPF_6$), lithium hexafluoarsenate ($LiAsF_6$), tetrabutylammonium para-toluenesulfonate, lithium perchlorate ($LiClO_4$), and tetrabutylammonium tetrafluoborate may also be used.

The polymers were grown on the working electrodes by applying a constant anodic current for periods of time extending from a few minutes to several hours. Current densities used in synthesizing the polymers varied from about 0.1 to about 5 mA/cm². Anodic potentials which were applied were in the range of about 0.5 to about 1 V, based on the above-mentioned reference electrodes. The reactions were carried out under argon at room temperature. When water was used as the solvent, the polymer formed on the electrode and immediately dissolved; it visibly streamed off the electrode. When the polymerization was carried out in a nonaqueous bath, the polymer film formed on the working electrode and was peeled off.

Water-soluble conductive polymers having a thiophene ring (X=sulfur) and alkyl groups containing 4, 6, 8, and 10 carbon atoms (m=4, 6, 8, or 10) were prepared. The surfactant molecules of these polymers were sulfonate groups with sodium, hydrogen, or potassium. Conductivity of polymers of this invention in a self-doped state were from about $10^{-3}$ to about $10^{-2}$ $\Omega^{-1}$ cm$^{-1}$. When negative ions from a supporting electrolyte were allowed to remain in the polymer, conductivities up to about 50 $\Omega^{-1}$cm$^{-1}$ were observed.

Conductivities of polymers without negative ions from a supporting electrolyte which were doped with vaporous sulfuric acid or $AsF_5$ were about $10^2$ $\Omega^{-1}cm^{-1}$. Polymers having liquid crystalline properties exhibited even higher conductivities, up to about $10^4 \Omega^{-1} cm^{-1}$, as can be seen in the examples presented below. It is expected that conductivities of $10^5 \Omega^{-1} cm^{-1}$ can be attained.

The polymers were air-stable; there was no loss of conductivity or other apparent change in the properties of the polymers upon exposure to the atmosphere. The polymers readily dissolved in water and could be recovered from a water solution by evaporation of the water. The polymers were not soluble in such organic solvents as acetone, acetonitrile, toluene, benzene, or tetrahydrofuran.

The polymers which were prepared had molecular weights of from about 40,000 to about 50,000. However, it is expected that polymers of the present invention will have molecular weights in the range of about 20,000 to about 70,000 with the number of repeat units in a single polymer molecule being from about 100 to about 300.

The alkali metals of the present invention are those in Group 1A of the Periodic Table excepting francium.

When the length of the alkyl chain is in the range of about 8 or more carbon atoms (m=8 or more), polymers of the present invention are liquid crystalline polymers in the lyotropic phase. Cholesteric behavior was observed in experimentation with poly(alkylsulfonate sodium thiophene)s having alkyl chain lengths of 8 and 10 carbons. A cloudy blue solution of the inventive compound consisted of typical mesophases of a lyotropic phase. The mesophases were observable by means of a polarizing film and a 100 power microscope or by means of the naked eye upon subjecting the solution to a magnetic field of 9 kilogauss (kG). The parallel orientation of liquid crystal molecules could be seen in the middle mesophase, which was, most likely, a nematic phase and which had a clear blue cast while in the magnetic field. A poly(octylsulfonate sodium thiophene) film recovered from the middle phase had a conductivity of about 10,000 $\Omega^{-1}cm^{-1}$ in a direction parallel to the backbones of the polymer molecule, that is, parallel to the orientation direction of the polymer. Conductivity of the film in a direction perpendicular to the molecule backbones, that is, to the orientation direction, was about 10 $\Omega^{-1}cm^{-1}$; thus, the electrical anisotropy of the film was 1000. Though experimentation was accomplished with 8 and 10 carbon chains, it is believed that the polymers of this invention are also liquid crystalline polymers when the number of carbon atoms in the alkyl chain is greater than 10.

It is possible that a surfactant molecule can be added to the first carbon atom of the alkyl chain of an alkylthiophene to form a monomer which may be polymerized to a water-soluble conductive polymer. This may be accomplished by reacting an acylchloride with thiophene in the presence of $FeCl_3$ or another catalyst, thereby substituting the thiopene ring for the chlorine atom of the acylchloride. A Friedel-Crafts procedure is then used to combine an $HSO_2$ group with the oxygen molecule which is linked to the first carbon of the alkyl chain. Thus, the resultant $SO_3$ group is as close to the ring as possible; this is expected to yield a water-soluble compound upon polymerization.

Conductivity measurements were accomplished by means of the four-probe technique. Four leads were attached to a sample of a polymer of the present invention with a conductive paste and a known current was passed through a known cross-sectional area of the sample. The voltage across a known length was measured and conductivity was calculated.

It is well-known that pyrrole and thiophene are virtually identical in their properties and that one can be substituted for the other with virtually no change in behavior resulting from the substitution.

Following are several specific examples of preparation of polymers of this invention. In all of the examples, the monomer used in the electrochemical polymerization was a 3-alkylsulfonate sodium thiophene and the following information is applicable. The initial concentration of monomer in the electrolytic bath was 0.1 mol/L and the electrolysis time was 1 hour. Both the counter electrode and working electrode were platinum foil. The solvent which comprised the electrolytic bath was either water or acetonitrile. The reference electrodes used were saturated calomel when the solvent was water and silver/silver nitrate when the solvent was acetonitrile. A polymer film was recovered from water solutions by evaporating the solution and from acetonitrile solutions by peeling the film off of the working electrode. The applied voltage was 1.0 V when the saturated calomel electrode was used and 0.5 V when the silver/silver nitrate electrode was used.

EXAMPLE 1

The alkyl chain contained 4 carbon atoms. In a water solvent, the current density was 1 $mA/cm^2$ and the conductivity of the polymer film recovered from the solution was $10^{-2}$ $\Omega^{-1}cm^{-1}$. When the solvent was acetonitrile, the current density was 0.5 $mA/cm^2$ and the conductivity was substantially the same.

Example 2

The alkyl chain contained 4 carbon atoms. A supporting electrolyte, tetraethylammonium para-toluenesulfonate, was used in a concentration of 0.1 mol/L of electrolyte bath. In a water solvent, the current density was 5 $mA/cm^2$ and the conductivity of the recovered polymer film was 50 $\Omega^{-1}cm^{-1}$. When the solvent was acetonitrile, the current density was 2 $mA/cm^2$ and the film conductivity was substantially the same.

Example 3

The alkyl chain length was 8 carbon atoms. In a water solvent, the current density was 0.5 $mA/cm^2$ and the conductivity of the recovered polymer film was $10^{-3} \Omega^{-1}cm^{-1}$. When the solvent was acetonitrile, the current density was 0.1 $mA/cm^2$ and the conductivity of the polymer film was substantially the same.

After the electrolysis period of 1 hour, viewing the water-based electrolyte bath through a 100 power microscope and polarizing film showed three separate phases. When the solution was subjected to a magnetic field of 9 kG, the three phases were observed without the use of a polarizing film or microscope. The middle phase, which was the liquid crystalline phase, was the clearest of the three phases and had a bluish cast, was isolated and evaporated to form a polymer film. The evaporation was carried out in a 9 kG magnetic field. The film exhibited electrical anisotropy: in a direction parallel to the orientation direction of the polymer chains, the conductivity was approximately 1 $\Omega^{-1}cm^{-1}$, while in a direction perpendicular to the orientation direction of the chains, the conductivity was $10^{-3}$ $\Omega^{-1}cm^{-1}$. Samples of the polymer film which were doped by exposure to sulfuric acid or AsF$_5$ vapor exhibited a parallel conductivity of $10^4$ $\Omega^{-1}$cm$^{-1}$ and a perpendicular conductivity of 10 $\Omega^{-1}$cm$^{-1}$; thus, the magnitude of the electrical anisotropy may be expressed as 1,000.

EXAMPLE 4

The alkyl chain length was 8 carbon atoms. A supporting electrolyte, lithium tetrafluoborate, was added to the elecrolyte bath in a concentration of 0.1 mol/L. In a water solvent, the current density was 3 mA/cm$^2$ and the conductivity of the recovered polymer film was 10 $\Omega^{-1}$cm$^{-1}$. When the solvent used was acetonitrile, the current density was 1 mA/cm$^2$ and the conductivity of the film was substantially the same.

As above, after the electrolysis period, it could be seen that the water-based bath had separated into three phases. A polymer film formed by evaporation of the middle phase in a 9 kG magnetic field exhibited an electrical anisotropy of 1,000, the conductivity in a direction parallel to the backbones, that is, parallel to the orientation direction of the polymer chains was $10^4$ $\Omega^{-1}$cm$^{-1}$ while the conductivity, in a direction perpendicular to the backbones, that is, perpendicular to the orientation direction, was 10 $\Omega^{-1}$cm$^{-1}$. Note that these conductivities are the same as those of the doped film of Example 3; the negative ions from the supporting electrolyte which become part of the polymer film produce the same conductivities as does doping by sulfuric acid or AsF$_5$ vapor.

The foregoing description of the invention has been presented for purposes of illustration and description. It is not intended to be exhaustive or to limit the invention to the precise form discussed above, since many modifications and variations are possible in light of the above teaching. The examples were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An electrically conductive self-doped polymeric composition of matter having a monomer repeat unit comprising:

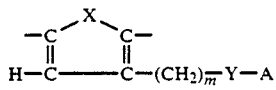

where the monomer-to-monomer bonds of said polymer are located between the carbon atoms adjacent to X;

where X is chosen from a group consistng of NH and S;

where m is a whole number having a value of from 1 to 20, inclusive;

where Y is chosen from a group consisting of SO$_3$, SO$_4$, and CO$_2$; and where A is chosen from a group consisting of hydrogen, lithium, sodium, potassium, rubidium, and cesium.

2. A composition of claim 1 having a molecular weight in the range of from about 20,000 to about 70,000.

3. A composition of claim 1 which is soluble in water.

4. A composition of claim 1 having a conductivity in the range of from about $10^{-3}$ to about $10^5$ ohm$^{-1}$cm$^{-1}$.

5. A composition of claim 1 containing an additional dopant to increase conductivity comprised of negative ions which are supplied from a supporting electrolyte substance utilized in synthesizing said composition.

6. A composition of claim 5 where said supporting electrolyte substance is chosen from a group comprised of tetraethylammonium para-toluenesulfonate, lithium perchlorate, tetrabutylammonium tetrafluoborate, lithium hexafluophosphate, lithium tetrafluorborate, lithium hexafluoarsenate, and tetrabutylammonium para-toluenesulfonate.

7. A composition of claim 1 having liquid crystalline properties, where X is sulfur, m has a value of 8 or 10, Y is an SO$_3$ group, and A is chosen from a group consisting of hydrogen, sodium, and potassium.

8. A composition of claim 7 having an electrical anisotropy of about 1000, the conductivity of the composition being about 10,000 ohm$^{-1}$ cm$^{-1}$ in a direction parallel to the orientation direction of the composition and about 10 ohm$^{-1}$cm$^{-1}$ in a direction perpendicular to the orientation direction of the composition.

9. A composition of claim 1 which is additionally doped to increase conductivity by exposure to sulfuric acid or arsenic pentafluoride.

* * * * *